United States Patent [19]
Saccon

[11] Patent Number: 5,947,103
[45] Date of Patent: Sep. 7, 1999

[54] STONE TILE FINISHING SYSTEM

[76] Inventor: Lorenzo Saccon, 25 Gambello Crescent, Toronto, Ontario, Canada, M3J 1W2

[21] Appl. No.: 09/003,134

[22] Filed: Jan. 6, 1998

[51] Int. Cl.[6] .................................................. B28D 1/04
[52] U.S. Cl. ..................... 125/13; 125/13.01; 125/13.03; 125/35
[58] Field of Search ................................ 83/471.2, 437.1, 83/372, 698.1; 125/13.01, 13.03, 35; 451/44

[56] References Cited

U.S. PATENT DOCUMENTS

| | | | |
|---|---|---|---|
| 3,621,829 | 11/1971 | Maluck | 125/13 |
| 3,807,095 | 4/1974 | Harding et al. | 125/13 |
| 4,280,472 | 7/1981 | Cochran | 125/13 |
| 4,940,038 | 7/1990 | O'Keefe | 125/13.01 |

*Primary Examiner*—David A. Scherbel
*Assistant Examiner*—Shantese McDonald

[57] ABSTRACT

A stone tile finishing system includes an apparatus and a group of different tools usable in the apparatus for various tile finishing operations. The apparatus itself has a motor, a tool mount rotated by the motor and a tile support movable relative to the motor. The tool mount has capacity to receive any one of the different tools. The motor is swingably held within the apparatus by a height adjustable motor mount which enables moving of the motor to different working positions relative to the tile support for carrying out the various tile finishing operations.

8 Claims, 5 Drawing Sheets

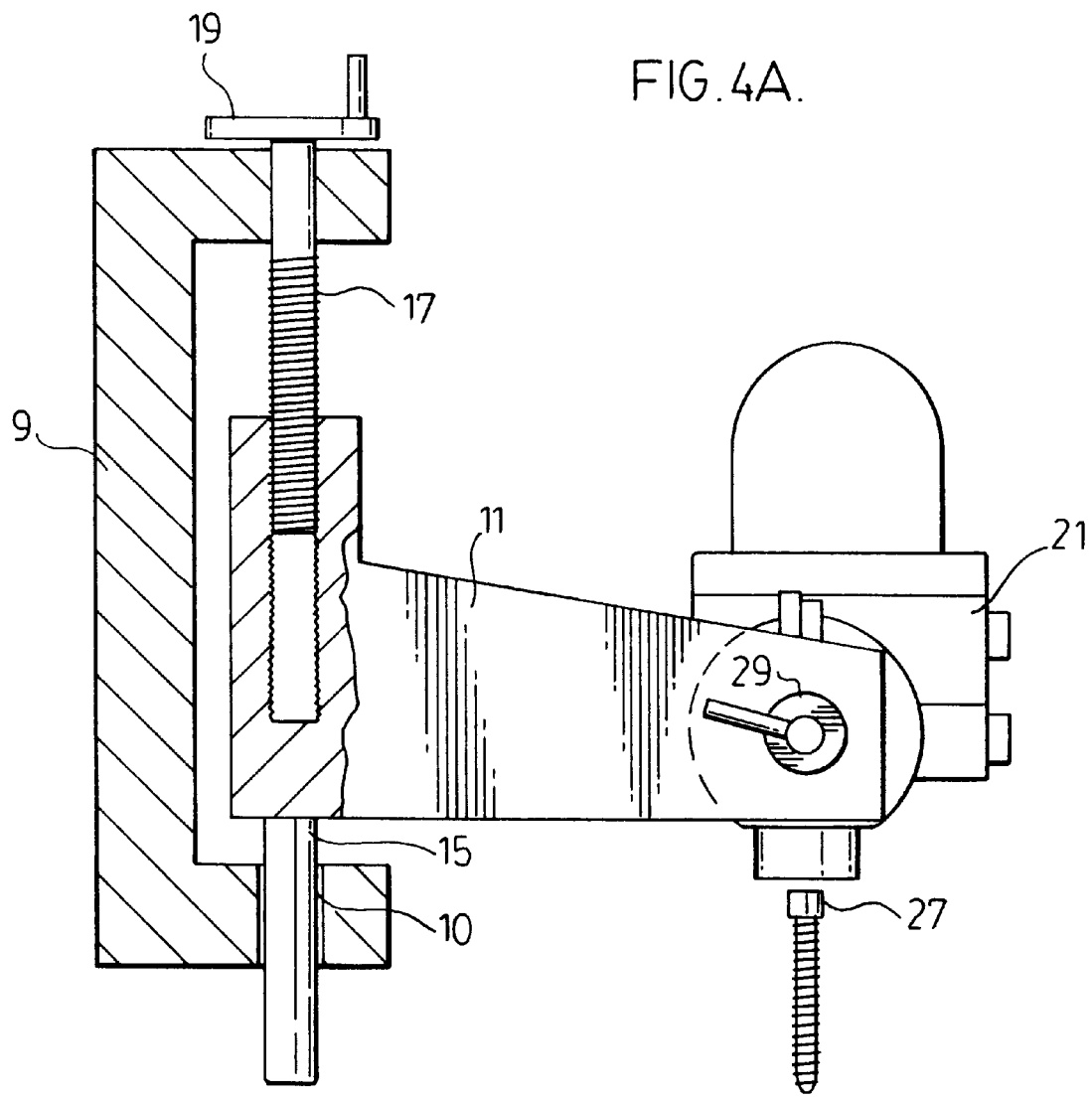

STONE TILE FINISHING SYSTEM

FIELD OF THE INVENTION

The present invention relates to a multi-function stone tile finishing system.

BACKGROUND OF THE INVENTION

Numerous different finishing operations are required when working with stone tiles. Some tiles must be cut to different sizes than others. Some tiles must have different edge finishes than others. Also, some tiles must be drilled to provide through passages. The tiles must then be completed in a polishing operation.

According to conventional practice, a plurality of different tool finishing apparatuses are required to perform the above different operations. If numerous different operations are required on a single tile, then that tile must be moved from one apparatus to another. Therefore, using known technology, it is costly from both an equipment and a time standpoint to provide different finishes to a stone tile.

SUMMARY OF THE INVENTION

The present invention provides a stone tile finishing system where various different tile finishing operations can be carried out in a single apparatus. That apparatus is usable with any one of a number of different tools.

The apparatus itself comprises a housing containing a motor with a tool mount rotated by the motor and a tile support movable relative to the motor. The tool mount has capacity to receive any one of the different tools and when in operation, a tool selected from the different tools is secured at the tool mount. The motor is swingably held in the apparatus by a height adjustable motor mount which enables moving of the motor to different working positions relative to the tile support for carrying out the various tile finishing operations.

BRIEF DESCRIPTION OF THE DRAWINGS

The above as well as other advantages and features of the present invention will be described in greater detail according to the preferred embodiments of the present invention in which;

FIG. 4A is a view similar to FIG. 4 showing the apparatus used for a tile drilling operation;

DETAILED DESCRIPTION ACCORDING TO THE PREFERRED EMBODIMENTS OF THE PRESENT INVENTION

Figure 1:
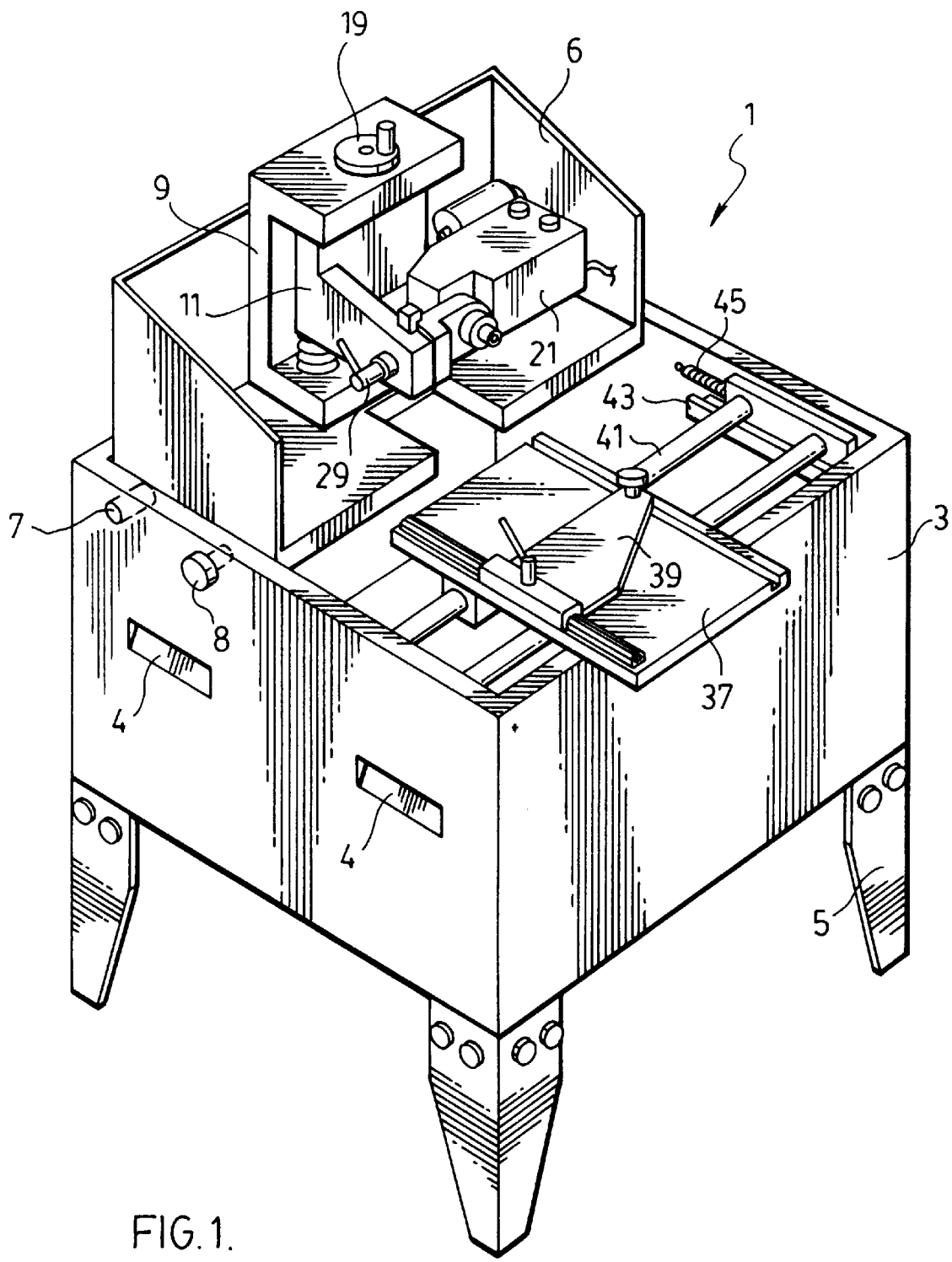
FIG. 1 is a perspective view of an apparatus used in a tile finishing system according to a preferred embodiment of the present invention.
Figure 2:
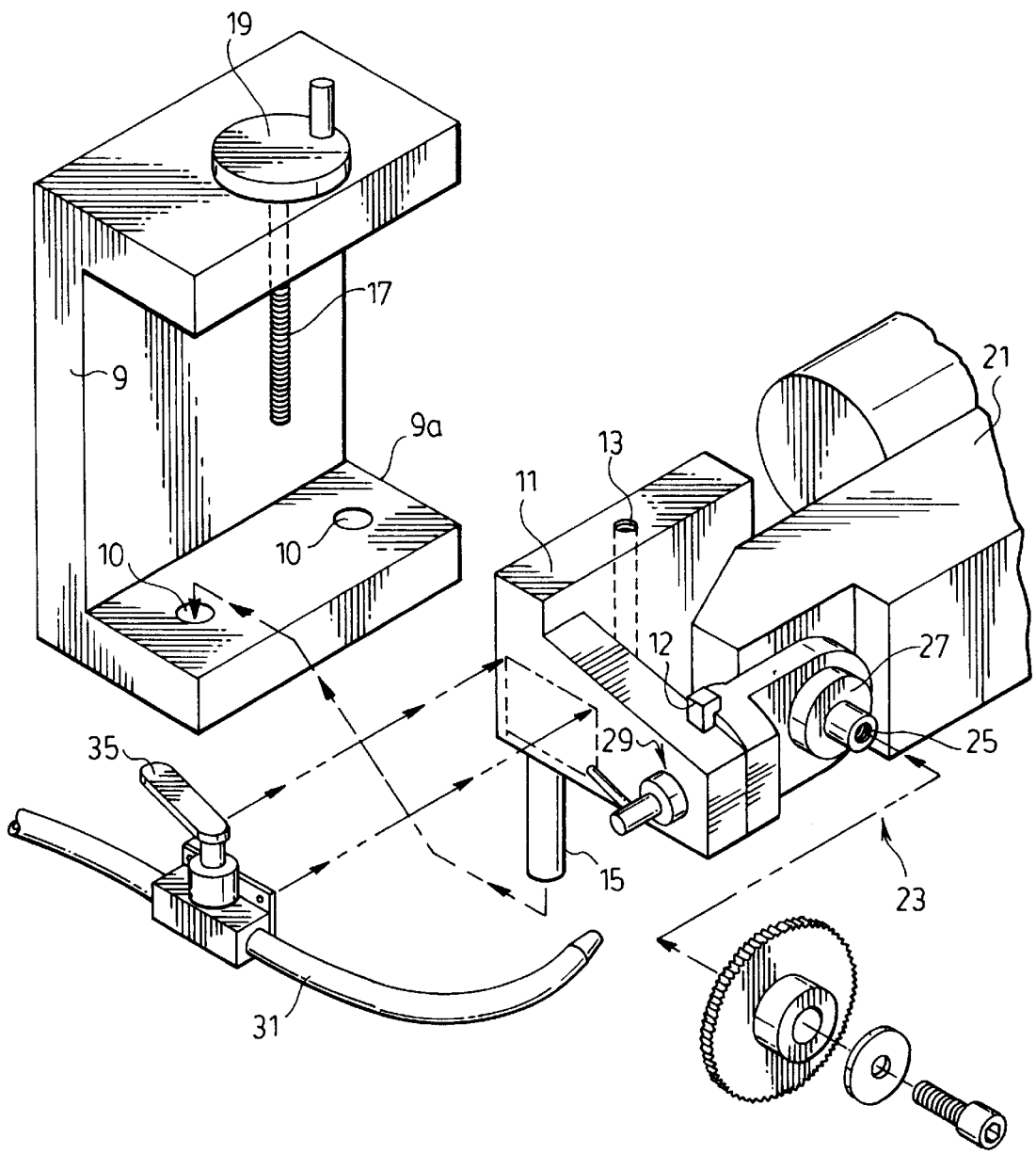
FIG. 2 is an enlarged exploded perspective view of the motor and motor mount used in the apparatus of FIG. 1.
Figure 3:
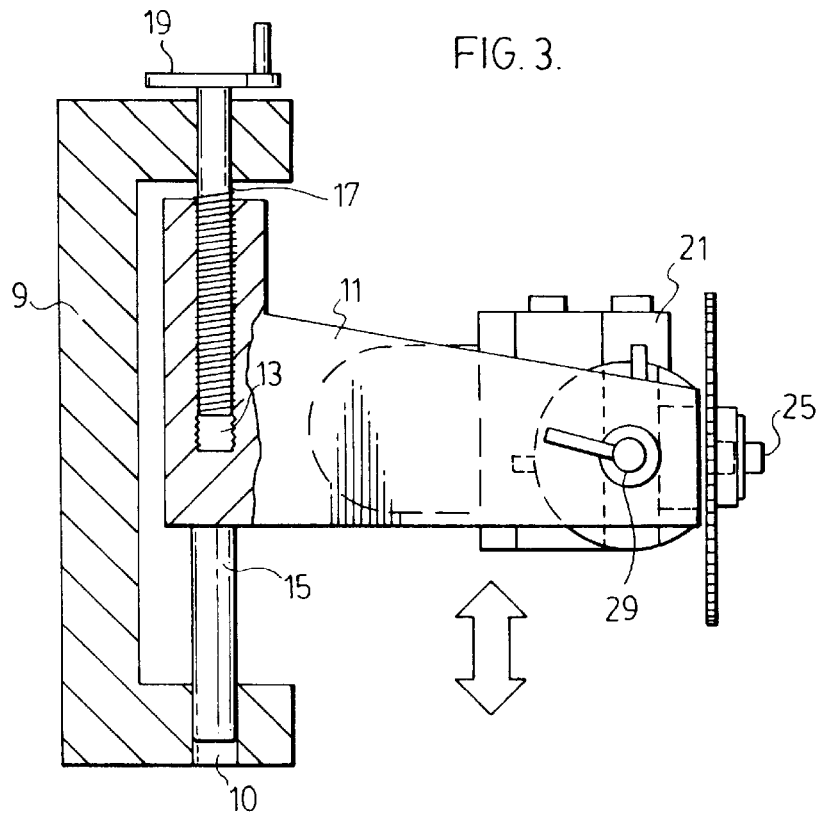
FIG. 3 is an assembled side view of the motor mount of FIG. 2 when used to perform a tile cutting operation.
Figure 4:
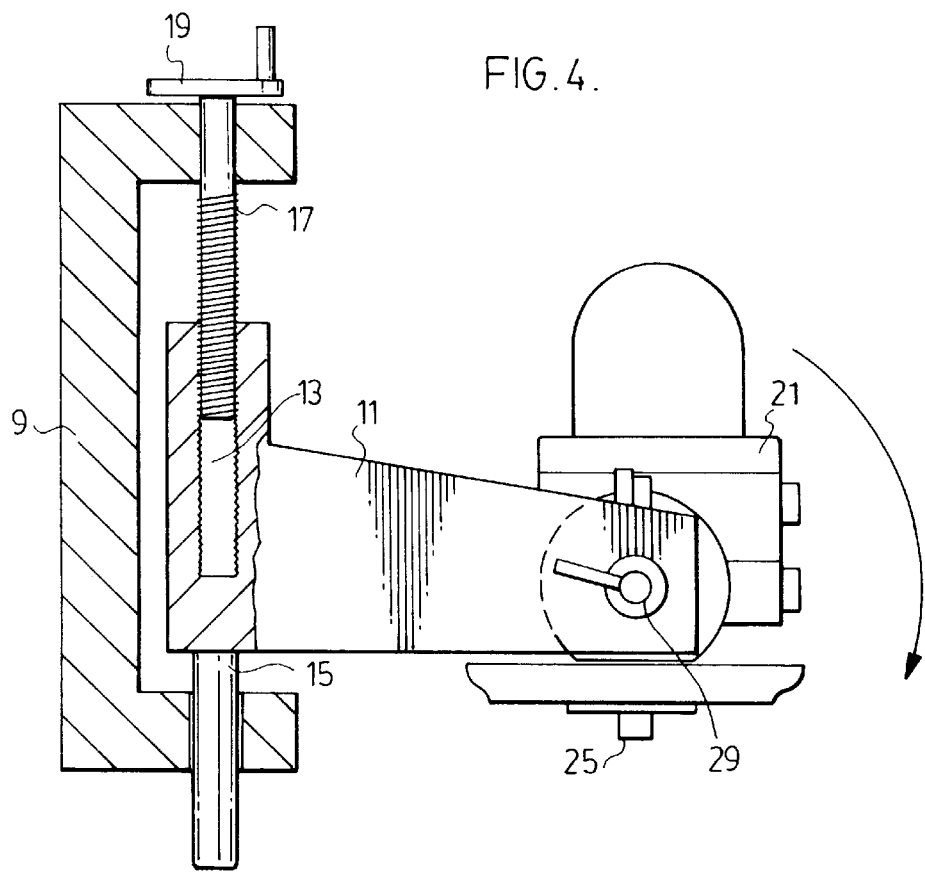
FIG. 4 is a view similar to FIG. 3, but showing the apparatus used to perform a tile edge finishing operation.

FIG. 1 shows a tool finishing apparatus generally indicated at 1. FIGS. 2 through 4 of the drawings show only some of the various different tools which are usable with the apparatus.

The apparatus itself comprises a main housing 3 supported in a working position by legs 5. Housing 3 includes recessed side handles 4.

A hood 6 is pivotally secured at 7 to the top of the housing. A releasable lock 8 holds the hood in the FIG. 1 use position.

A motor mount to which a motor 21 is adjustably secured is secured to the hood 6. This motor mount comprises a main frame portion 9 and movable frame portion 11.

Referring to FIG. 2, it will be seen that the main frame portion 9 of the motor mount has a bottom seat 9a provided with a pair of openings 10. The movable frame portion 11 includes a pair of legs 15 only one of which can be seen in FIG. 2. These two legs are slideably fitted into the openings 10 in frame portion 9.

Frame portion 11 further includes a threaded opening 13 while frame portion 9 includes a threaded adjustment member 17. This adjustment member is rotated by a hand control 19 on the outer face of frame portion 9.

FIGS. 3 and 4 show that the frame portion 11 is adjusted in an up and down fashion relative to frame portion 9 by turning the handle 19 of threaded adjustment member 17. Posts 15 on frame portion 11 slide through the openings 10 in frame portion 9 to guide the movement of frame portion 11.

Motor 21 rotates a tool mount generally indicated at 23. This tool mount comprises a threaded center shaft 25 having a back plate 27. FIGS. 2 and 3 show a saw blade held at the tool mount. The inside face of the saw blade is held against plate 27 and secured in position by a bolt which threads into shaft 25.

FIG. 3 shows the apparatus set up for a tile cutting operation. The motor mount carrying the motor is adjustable in a vertical direction as earlier described relative to a tile support 37 seen in FIG. 1 of the drawings. This tile support on which a stone tile is placed is slideably held on a pair of guide rods 41. A tile positioning gauge 37 is provided on the top surface of the tile support. This gauge is adjustable to accurately move the tile to different positions relative to the motor.

A tile, when secured on support 37 is forced with sliding movement of the support to pass beneath the saw blade which is dropped down into a working position by lowering motor mount 11 and motor 21. The height adjustment of the motor is controlled in very small increments according to the depth of the cut required in the tile. In some cases, the tile may be cut completely through and in other cases, the cut may only be partially through the tile. The threading on adjustment member 17 is sufficiently fine to allow very minute accurate adjustments of the height of the motor according to the desired cut.

A key feature of the present invention relates to the fact that motor 21 is swingably held on the motor mount. More particularly, the motor is secured by a swivel connection generally indicated at 29 to the motor mount. This swivel connection includes an adjustable release and tightening member as shown. This allows the motor to be swung from the FIG. 3 to the FIG. 4 position through a full 90° or any angle therebetween. A stop 12 prevents the motor from swinging through more than 90+.

Figure 6:
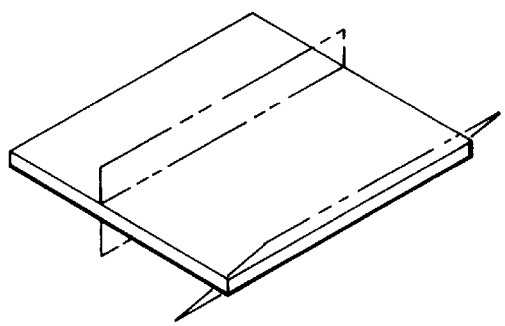
FIGS. 6 through 10 show tiles on which a number of different tile finishing operations have been performed using the tile finishing system of the present invention.
Figure 10:

As will be seen in FIG. 3, shaft 23 is extending in a horizontal position whereas in FIG. 4, the motor has been swung such that the shaft is now facing in a vertical direction. FIG. 4 also shows a bullnozing tool rather than a saw fitted to the tool mount. This bullnozing tool is rotated in a horizontal plane to provide a tile edge finish as shown in FIG. 10 rather than to provide a tile cutting operation as shown in FIG. 6.

Figure 9:
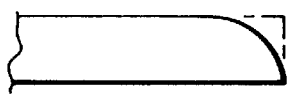

The bullnozing tool can be replaced by different types of edge finishing tools to provide other edge finishes. FIG. 9 for example shows that a different tool can be fitted to the tool mount to provide a rounded tile edge.

Figure 8:
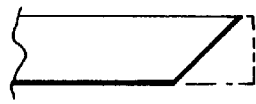

As earlier mentioned, motor 21 can be adjusted to and secured at different angles between the FIG. 3 and FIG. 4 positions. For example, by rotating the motor through a 45° rather than a 90° angle and again using the saw blade, the tile can be provided with a mitered edge as shown in FIG. 8 of the drawings.

Figure 7:
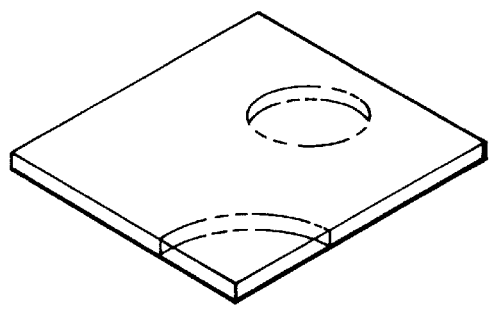

FIG. 4a of the drawings show a drill bit 27 which is threaded directly into shaft 25. This bit is used to perform drilling operations on the tile as shown in FIG. 7 of the drawings. The drill bit can be replaced with a router to perform routing operations. These operations can be used to provide holes through the tile or finishes at the edge of the tile.

The apparatus includes a mounting system for the tile support which helps in a tile cutting operation. More particularly, the ends of the guides 41 for support 37 are adjustably seated on a track 43. A tension spring 45 urges the guides to their normal working position. In this position, support 37 carrying the tile is pushed across the guides where the saw blade provides a cut in the tile. It may however be difficult to return the support plate carrying the tile back to the starting position because of interference with the tile. The spring loading of the guides 41 allows the support plate carried by the guides to be manipulated to clear the tile.

The main body of housing 3 is provided with a lower water chamber 2. A pump operated flexible hose 31 draws water from the chamber and directs the water for cooling purposes at the tool in the tool mount. A valve 35 controls the water flow through the hose. The water after being used to perform its cooling function drips back down into the main chamber of the housing where it is recycled for further use. The flexibility of the hose allows it to move up and down with the motor.

Although only certain tools and finishing operations have been described above, it is to be appreciated that other tools can also be used for performing further tile finishing operations.

Figure 5:
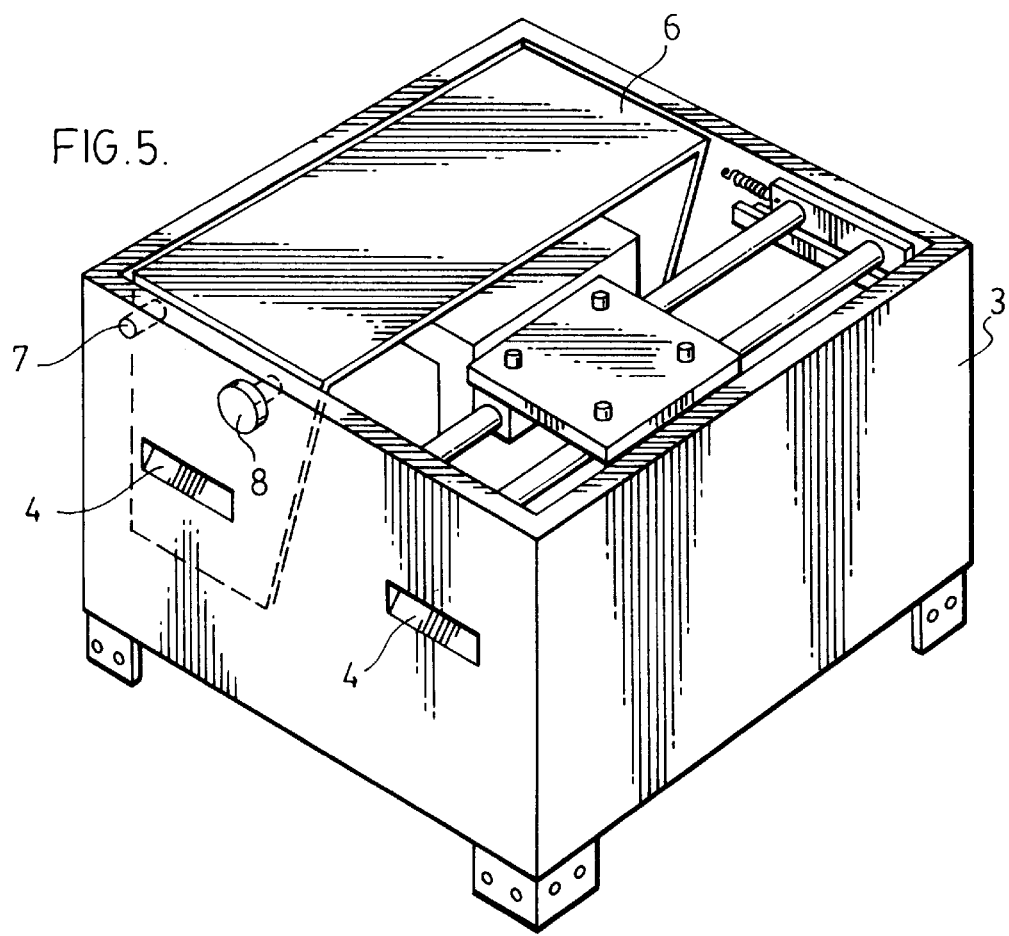
FIG. 5 is a perspective view of the apparatus of FIG. 1 in a storage position.

From the description above, it will now be understood how numerous different tile finishing operations can be performed using a single relatively compact apparatus. As a further feature, the apparatus itself can be converted from the use position of FIG. 1 to a portable position as shown in FIG. 5. In this position support plate 37 and legs 5 are removed and stored in the main chamber of housing 3 after it has been drained. Lock member 8 is released and hood 6 is swung down such that the motor and the motor mount are also contained within the main chamber of the housing protected by the hood. The lock is then moved back into the locking position to hold the hood closed relative to the housing. The housing is now easily carried by the handles 4 to any desired location.

Although various preferred embodiments of the present invention have been described in detail, it will be appreciated by those skilled in the art, that variations may be made without departing from the spirit of the invention or the scope of the appended claims.

The embodiments of the invention in which an exclusive property or privilege is claimed are defined as follows:

1. A stone tile finishing system comprising an apparatus and a group of different tools usable in said apparatus for various tile finishing operations, said apparatus comprising a housing containing a motor, a tool mount rotated by said motor, said tool mount having capacity to receive any one of said different tools, a tool selected from said group of different tools secured at said tool mount and a tile support movable relative to said tool mount, said motor being swingably held by a height adjustable motor mount which enables moving of said motor to different working positions relative to said tile support for carrying out the various tile finishing operations.

2. A stone tile finishing apparatus which receives any one of numerous different finishing tools for various tile finishing operations, said apparatus comprising a housing, a motor within said housing, a tool mount rotated by said motor and having capacity to receive numerous different tools, and a tile support movable relative to said tool mount, said motor being swingably connected to a height adjustable motor mount which enables both different height and angled settings of said motor relative to said tile support for carrying out the various tile finishing operations.

3. A stone tile finishing apparatus as claimed in claim 2, wherein said motor is secured to said motor mount by a swivel connection having a releasable lock which allows the different angled settings of said motor relative to said motor mount.

4. A stone tile finishing system as claimed in claim 3, wherein said motor is swingable through a 90° angle.

5. A stone tile finishing apparatus as claimed in claim 2, having a self contained water supply and a movable hose which is carried by said motor mount and which directs water from said water supply at said tool mount regardless of the height setting of said tool mount.

6. A stone tile finishing apparatus as claimed in claim 2, wherein said motor mount holding said motor is supported on a movable portion of said housing, said movable portion holding said motor mount and motor in a working position exposed outwardly of said housing and being movable to carry said motor mount and motor to a storage position inside of said housing.

7. A stone tile finishing apparatus as claimed in claim 6, wherein said movable portion comprises a hood which covers said motor mount and motor in the storage position.

8. A stone tile finishing apparatus as claimed in claim 2, wherein said tile support is held on a guide which is spring loaded to adjust positioning of said guide.

* * * * *